INVENTOR.
ARTHUR H. YOUMANS
BY E. F. Bard
ATTORNEY

INVENTOR.
ARTHUR H. YOUMANS

INVENTOR.
ARTHUR H. YOUMANS
BY E. F. Bard
ATTORNEY

INVENTOR.
ARTHUR H. YOUMANS

# United States Patent Office 3,379,882
Patented Apr. 23, 1968

3,379,882
METHOD AND APPARATUS FOR NEUTRON WELL LOGGING BASED ON THE LIFETIME OF NEUTRONS IN THE FORMATIONS
Arthur H. Youmans, Houston, Tex., assignor, by mesne assignments, to Dresser Industries, Inc., Dallas, Tex., a corporation of Delaware
Continuation of application Ser. No. 292,927, July 5, 1963, which is a continuation-in-part of application Ser. No. 435,698, June 10, 1954. This application Mar. 16, 1967, Ser. No. 623,778
44 Claims. (Cl. 250—71.5)

This invention relates to the art of geophysical prospecting in general and to the art of radioactivity well logging in particular and more particularly to such logging wherein the lifetime of neutrons in the formations is measured.

This is a continuation of application Ser. No. 292,927, July 5, 1963, which is a continuation-in-part of a co-pending application for U.S. Letters Patent filed June 10, 1954, and having Ser. No. 435,698.

Radioactivity well logging is conventionally of two sorts, natural gamma ray logging and neutron logging. Neutron well logging is conventionally performed by traversing a well with a radium-beryllium source of energetic neutrons, thereby continuously irradiating the formations penetrated by the well with fast neutrons, and simultaneously measuring and recording the number of neutrons or gamma rays returning to the well as a result of such irradiation.

An improvement in neutron well logging shown in the prior art utilizes a periodically varying neutron source whereby the neutron irradiation of the formations is periodically cut off. Such a source comprises a material emitting alpha particles with a disc rotating beside it having alternate sectors made of material emitting neutrons when exposed to alpha particles. The disc is rotated to turn the neutron source off and on at an audio frequency. A continuously operating detector detects secondary radiation emitted from the formations as a result of the irradiations, and the audio frequency component in the detection signal is amplified the recorded to the exclusion of any constant detection signal related to the natural gamma radiation. In the instant invention, not only the neutron source but also the detecting system is periodically varied.

It is known in the prior art to irradiate the formations for a period of time sufficient to activate an appreciable number of nuclei of material in the formations, thereby rendering the material artificially radioactive, and an interval of time following the cessation of irradiation to measure this artificial radioactivity. The time is related to half life of the activated material and is of the order of minutes or seconds for such of the common elements of the earth as are activated appreciably by this means. This may be accomplished by causing the source to be turned on and oc at a frequency related to half life and detecting continuously or the detector may follow a continuously emitting neutron source through the wall at such spacing and rate as to cause the detector to arrive at a particular point in the well a predetermined interval after irradiation. In the instant invention the period of the periodically varying source and detector system is related not to the half life of the irradiated material but to the lifetime of the neutrons in the formations, that is, to the time needed for fast neutrons emitted from the source to be slowed and captured. This time is of the order of 200 microseconds.

In the instant invention the formations are irradiated with neutrons from a periodically varying source operating at a frequency of the order magnitude of 2,500 cycles per second, being thus alternately on and off for periods of 200 microseconds. A detecting system is synchronized with the source to operate while the source is off. The radiation detected may be either slow neutrons or gamma rays which result from thermal neutron capture; in either case the signal is related to the population of thermal neutrons. From the time the source is turned off the slow neutrons are gradually captured and detection per unit time decreases until the source is again turned on. By measuring the number of thermal neutrons present at any particular time the rate of decay of the thermal neutron population may be measured. This rate of decay is dependent upon the nuclei of the material present in the formations and varies from formation to formation. This rate of decay is related to the time required for these nuclei to capture slow neutrons and for the thermal neutrons to diffuse away; therefore, the measurement is related to this time and hence to the lifetime of the neutrons in the formations and to the albedo of the formations.

Therefore, the principal object of this invention is to provide method and apparatus for determining the lifetime of neutrons in the formations about a borehole. It is a further object of this invention to provide method and apparatus for neutron well logging based on the lifetime of neutrons in the formations. Other objects and advantages will become apparent from the following detailed descriptions, when considered with the accompanying drawings, in which.

Figures 1, 2:
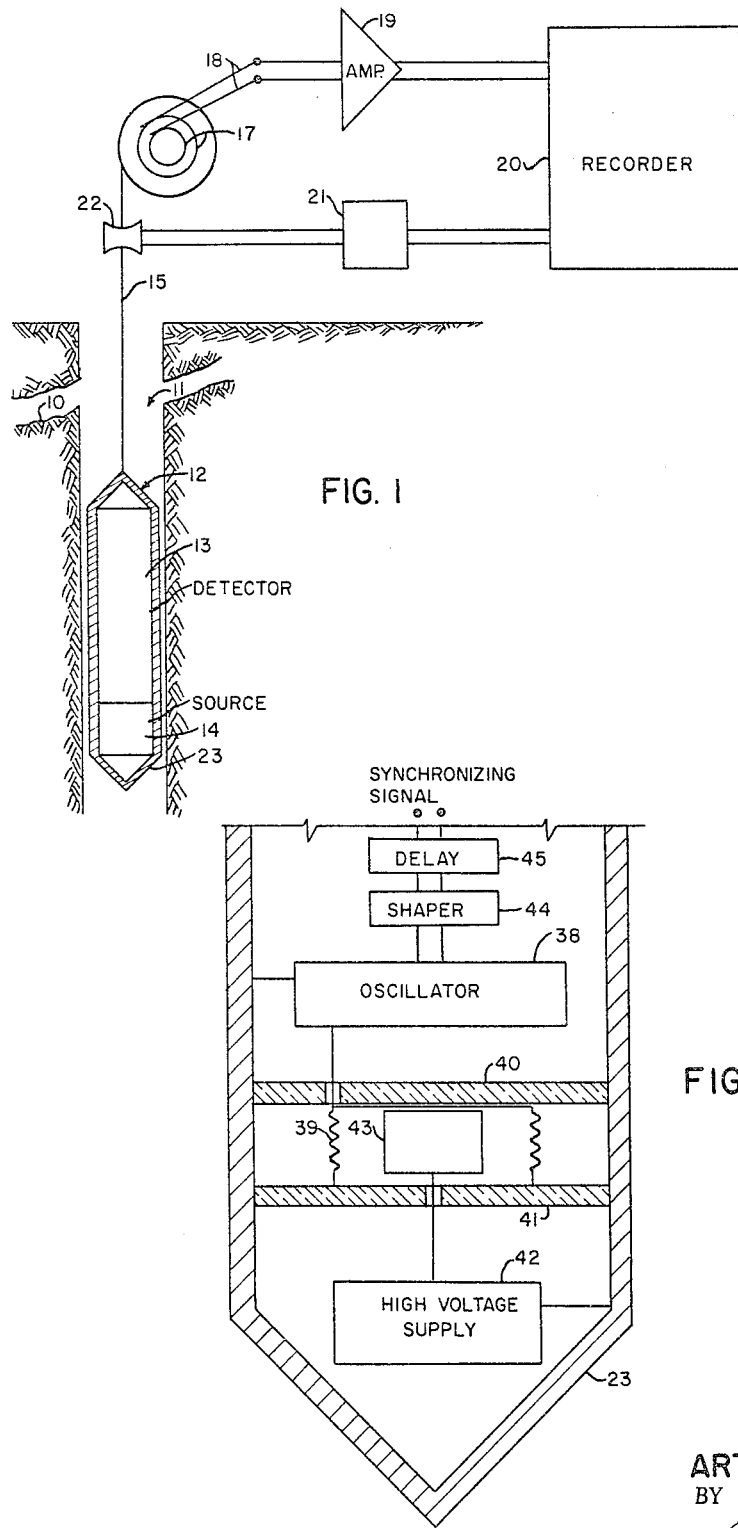
FIGURE 1 is a diagrammatic illustration of a radioactivity well logging operation.
FIGURE 2 is a sectional view of an accelerator source of neutrons capable of delivering a pulsed neutron output.

Without engaging in an involved discussion of the complexities of nuclear physics, it may be broadly stated that when a formation is irradiated with fast neutrons, the neutrons will penetrate more or less deeply into the formation, and will interact with the formation nuclei in a variety of ways. Moreover, during the lifetime of a particular neutron, it may successively collide with many nuclei and enter into a different type of reaction with each collision. The kind of reaction produced by a collision will depend upon several factors, not the least of which is chance. However, the factors which are most important in well logging operations are the speed of the bombarding neutron, and the type of nucleus bombarded. During its lifetime, a particular neutron may be expected to collide with one or more formation nuclei, and to lose some of its energy in each such collision. After the neutron is "slowed" to thermal energy, the neutron may be expected to be promptly captured and thus disappear.

When a fast neutron strikes a formation nucleus, any one of many different types of nuclear reactions may occur, and the probability that a particular type of reaction will occur depends upon the speed of the bombarding neutron and the character of the struck nucleus. A given type of nucleus will produce only certain reactions. Furthermore, certain reactions will only occur if a particular type of nucleus is struck by a neutron having at least a minimum speed. Thus, very high energy (14.4 mev.) neutrons from a D-T accelerator will produce almost every conceivable type of nuclear reaction, depending upon the character of the nuclei bombarded. Furthermore, a fast neutron may enter into one type of nuclear reaction early in life, and after being slowed, create different additional reactions when colliding at a lower energy with nuclei of the same type. Nevertheless, certain reactions are well known to greatly predominate, and unless otherwise specified, all other reactions are generally ignored for commercial well logging purposes.

The three types of fast neutron reactions, which predominately occur when earth substances are irradiated, are elastic scattering, inelastic scattering, and so-called "activation." In the case of both elastic and inelastic scattering, the bombarding neutron is redirected off in a new direction after suffering a loss of energy, and the extent of such loss is substantially a function of the character of the struck nucleus. The most useful difference between these two types of scattering reactions is the fact that elastic scattering does not produce any secondary radiation, whereas an inelastic scattering reaction instantaneously produces one or more gamma rays as a result of the collision.

In the case of "activation," the bombarding neutron transmutes the struck nucleus into an unstable isotope which more or less promptly "decays" to a stable state. During its unstable state, however, the transmuted nucleus emits gamma rays in number and energy, and for an interval, according to the character of the nucleus. The "half lives" of many such unstable isotopes have been carefully measured or computed, and "activation analysis" is useful for determining the composition of an unknown material. Although "activation" has hereinbefore been referred to as a fast neutron reaction, this is not entirely accurate, since some nuclei (notably aluminum and sodium) can be activated with neutrons of only thermal energy. Generally, any activation reaction is strictly a threshold type of reaction; i.e., only a neutron having at least a minimum amount of energy can produce a particular reaction. However, when a D-T accelerator is used, many different "activation" reactions will be produced in earth substances, since the thresholds of most known activation reactions are well below the initial energy of a D-T neutron.

After a fast neutron has been slowed by one or more of the aforementioned three types of reactions, and has been reduced to thermal energy, it is generally "captured" within a short time. A capture reaction will instantaneously produce one or more gamma rays having a number and energy directly related to the character of the capturing nucleus. However, the energy and number of gamma rays produced by an inelastic scattering reaction is generally not the same as that of gamma radiation produced by a capture reaction, even if the same type of nucleus is involved. Thus, capture gamma radiation may be distinguished by spectral analysis from inelastic scattering gamma radiation.

The terms "fast," "slow," "eptihermal," and "thermal," are commonly used throughout the well logging industry to indicate generally the speed or energy of neutrons. Although such classification is purely arbitrary, it is generally understood that a "fast" neutron is one which is traveling at a speed greater than 1 mev., and a "slow" neutron is one which is traveling at less than 1 mev., but greater than the speed of a thermal or epithermal neutron. The term "thermal" is almost universally used to indicate a neutron which is traveling at a speed of 0.025 ev.; and the term "epithermal" is generally applied to neutrons traveling at an energy within the range 100 ev.– 0.025 ev. Unless otherwise defined, the terms "fast," "slow," etc. may be assumed herein to have the foregoing meaning.

It is well known in well logging that a fast neutron may proceed in any direction after undergoing either elastic or inelastic scattering in the formation. Thus, most of the scattered neutrons will eventually disappear in the earth. However, a representative number of these scattered fast neutrons will re-enter the borehole and strike the detector, and if the detector is adapted to respond to incident fast neutrons, an accurate measurement may be obtained of the fast neutron "population" in the irradiated formations. Thus, if the formation is irradiated with only a very short burst of fast neutrons, a measurement of the decline rate of these fast neutrons in the formation will furnish a direct indication of the slowing effect had, on fast neutrons, by the formation nuclei. This, in turn, furnishes valuable information concerning the character of the formation substances. For example, hydrogeneous substances such as water and petroleum exercise the most severe slowing effect on fast neutrons, of all the common earth substances, and therefore a sharp decrease in the fast neutron counting rate will often reveal a fluid-bearing formation of particular interest.

On the other hand, fast neutrons will decay to thermal energy quite rapidly irrespective of the nature of the irradiated substances. Thus, it is apparent that an accurate measurement of the lifetime or decline rate of fast neutrons necessitates the commencement of the detection interval during the neutron pulse, and the termination of the detection interval within a very short time after the termination of the output of the neutron source. In other words, the ideal measurement of the decline rate of fast neutrons must be commenced with the occurrence of the fast neutron population peak, and must be terminated immediately after the last fast neutron is thermalized. As will hereinafter be shown in details, the decline of the fast neutron population always occurs within a very short intervals, even when a non-hydrogeneous formation is irradiated. Even if the detector is adapted to measure the instantaneous gammas produced by fast neutron processes (inelastic scattering), which decay somewhat more slowly, it is obvious that a direct measurement of fast neutron lifetime is extremely difficult to perform under ordinary well logging conditions.

On the other hand, the thermal neutron population is produced by the slowing of the fast neutrons by the irradiated formation substances. Furthermore, it is apparent that the lifetime or decline rate of the thermal neutron population is functionally related to the lifetime of the fast neutron population. Since the decline rate of the thermal neutron population is much slower than that of the fast neutron population, as is hereinafter shown in FIGURES 5–7 of the accompanying drawings, it is clearly apparent that a thermal neutron (or capture gamma) measurement will be much easier to perform, and will be consistently more accurate.

In theory, it is the decline of the total neutron population, fast as well as slow, which is sought to be measured. However, fast neutrons are slowed very rapidly, whereas slow and thermal neutrons continue to exist for comparatively extended periods. Thus, it is more practical to measure only the lifetime of either the slow or the thermal neutron population. Furthermore, since many slow neutrons will be thermalized in the borehole fluids, instead of in the formation, it is preferable to measure the capture gamma radiation produced by the thermal neutron population, rather than to measure the thermal neutrons directly. Although these gammas will also be scattered before reaching the detector, the capture gamma ray measurement will actually be more directly indicative of what has occurred in the formations, than will a thermal neutron measurement.

Although the inelastic scattering gammas produced by neutron bombardment of one type of nuclei (such as iron) may readily be distinguished from capture gamma radiation, by spectral analysis, this is much more difficult when the irradiated substances include an aggregate of many different types of nuclei. Thus, if a measurement is made of the entire gamma ray flux produced by the neutron pulse, the initial portion of the gamma ray population curve (see FIGURES 5-7) will depend substantially upon the gammas produced by the fast neutron processes, and that the latter portions of the gamma ray population curve will depend entirely upon the slow and thermal neutron processes in the formation. Thus, the inelastic scattering gammas are preferably distinguished from the capture gammas by initiating the detection interval only after the inelastic gammas may be expected to have substantially disappeared. In other words, the inelastic scattering gammas may be selectively detected if the detection interval is commenced during the irradiation pulse, and if the capture gammas are systematically excluded by terminating the detection interval as soon as possible before the thermal neutron population may be expected to reach a peak.

Of course, the accuracy of a capture gamma measurement will be substantially increased if the inelastic scattering gammas can be excluded therefrom. This is accomplished by simply waiting until the fast neutrons may be expected to have been thermalized, before initiating the detection interval. In other words, the detection interval is preferably commenced only after the relatively short-lived inelastic scattering gammas may be expected to have been dissipated in the earth, and when the thermal neutron population has reached its peak.

Clearly, it is not necessary to extend the detection interval over the entire lifetime of the neutron or gamma ray population sought to be measured. Since the measurements are expected to be made repetitively as the logging tool is passed through the boreholes, the detection interval may encompass only a similar portion of the decline curve produced by each neutron pulse. Furthermore, two or more portions of the decline curve may continuously be selected and measured, and the ratios of the measurements derived therefrom may furnish additional information regarding the character of the formations.

As has hereinbefore been explained, high energy neutron bombardment will produce a substantial amount of activation of the formation substances, as well as the scattering and capture with which applicant is primarily concerned. Furthermore, the occurrence of these activation gammas will commence with the first neutron pulse, and will continue until the last unstable nucleus has decayed into its stable state. Clearly, the presence of these activation gammas will constitute an interfering factor insofar as accurate measurements of the inelastic scattering and capture gamma rays are concerned. Since the activation gammas are continually present, they cannot be excluded from the measurement by selective timing of the detection interval, as the inelastic scattering gammas are excluded from measurements of the capture gammas. However, it should be remembered that, like the other classes of radiation, activation will reach a level of equilibrium as a result of bombardment by repetitive pulses of neutrons. Therefore, the effect of these activation gammas may be substantially mitigated by terminating the detection interval with or before the disappearance of the radiation sought to be measured. Thus, the presence of the activation gammas will form a constant level of "background," and may be compensated for accordingly.

If an extremely accurate measurement of either the inelastic scattering or capture gamma rays is sought, however, the activation gammas may be distinguished by means of pulse height analysis of the detector output signal.

Of course, there is no reason pertinent to the present invention why there should be any extended interval between the disappearance of the capture gamma rays and the initiation of the next succeeding pulse of neutrons. Thus, the effect of the activation gamma radiation may be effectively eliminated, by establishing the neutron pulsation rate so as to provide a quiescent interval equal only to the maximum expected decay time of the capture gamma ray population.

Although the present invention is primarily directed to the measurement of the lifetime of the neutron population in the formation, and the preferred embodiment of this invention consists of measuring the lifetime of the capture gammas produced by each neutron pulse, there are many other useful embodiments not hereinbefore mentioned. It is well known, for example, that the gamma rays produced by both inelastic scattering and neutron capture reactions may be spectrally analyzed to determine the composition of a neutron-irradiated substance, and this is particularly useful in subsurface well logging. Furthermore, since a considerable amount of time is necessarily consumed in logging a borehole, it is desirable that several measurements be performed during a single trip in the borehole. Thus, the present invention includes the provision of methods and apparatus for measuring not only the lifetime of the gamma ray population produced in the formations by the neutrons, but also the spectral analysis of such gamma rays to determine the extent of certain elements in the formation substances. Since such measurements are taken simultaneously and corelatively, one to another, useful ratios of various combinations of these measurements are readily obtainable in a more accurate form by means of the present invention.

Referring now to the drawings in detail, particularly to FIGURE 1, there is illustrated schematically a radioactivity well surveying operation in which a portion of the earth's surface 10 is shown in vertical section. A well 11 penetrates the earth's surface and may or may not be cased. Disposed within the well is subsurface instrument 12 of the well logging system. Subsurface instrument 12 comprises a detecting system 13 and a neutron source 14. Cable 15 suspends the instrument in the well and contains the required conductors for electrically connecting the instrument with the surface apparatus. The cable is wound on or unwound from drum 16 in raising and lowering the instrument 12 to traverse the well.

In making a radioactivity log of a well, instrument 12 is caused to traverse the well. Thereby neutrons from source 14 irradiate the formations surrounding the borehole and radiations influenced by the formations are detected by detecting system 13. The resultant signal is sent to the surface through cable 15. Through slip rings 17 and brushes 18 on the end of the drum, the signal may be conducted to amplifier 19 for amplification. The amplified signal is conducted to recorder 20 and recorded. Recorder 20 is driven through a transmission 21 by measuring reel 22 over which cable 15 is drawn so that recorder 20 moves in correlation with depth as instrument 12 traverses the well. The elements are shown diagrammatically, and it is to be understood that the associated circuits and power supplies are provided in a conventional manner. Amplifier 19 may be included in the subsurface instrument, or amplification may be effected both on the surface and in the subsurface instrument. It is also to be understood that the instrument housing 23 will be constructed to withstand the pressures and mechanical and thermal abuses encountered in logging a deep well and provide adequate space within it to house the necessary apparatus and permit the transmission of radiation through it.

In FIGURE 2 there is illustrated a form of the source 14 comprising a deuterium-tritium reactor and associated circuits within housing 23. Oscillator 38 produces a periodic voltage which may be a square-wave and 2,000 volts. This voltage is applied between grid 39 and the housing 23. This periodically accelerates the electrons and ions in the region therebetween and ionizes the deuterium gas which is confined by insulators 40 and 41 and the housing 23. High voltage source 42 is of the order of 200,000 volts. It is applied between central target electrode 43 and the housing with the target electrode negative. The target electrode 43 contains tritium. Deuterium ions are accelerated from the region between grid 29 and housing 23 against the tritium in the target electrode 43 at high speed. The deuterium ions react with the tritium nuclei to release high energy neutrons of approximately 14 mev. The periodic voltage supplied by oscillator 38 creates ionization periodically and hence causes the neutrons to be emitted periodically at the same frequency. A second output of oscillator 38 is applied to shaper 44 which is a conventional circuit providing an output of particular pulse height and pulse length, as desired. The output of shaper 44 is passed through delay circuit 45, the output of which is thereby delayed a desired amount from the output of oscillator 38 as applied to pulse the neutron source. This voltage may be used in the fashion of the voltage across resistor 36 to synchronize a detecting system, for this voltage is in synchronism with the neutron source.

Figure 3:
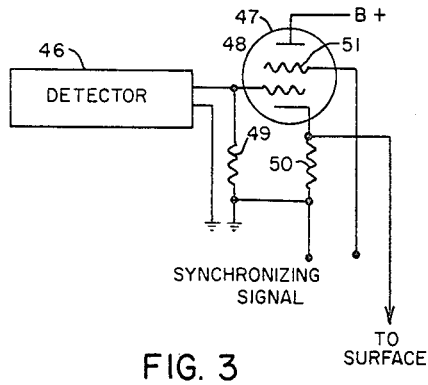
FIGURE 3 is a diagrammatic illustration of a detecting system showing means for synchronization with the neutron source.

In FIGURE 3 is shown one form of the detecting system 13 including means for turning the detecting system on and off in synchronism with the neutron source. Detector 46 is a conventional transducer of radiation converting the incident gamma rays or neutrons into electrical signals. The only requirement of this detector is that its time constant be less than the portion of the cycle during which the detecting system is on. It may be a conventional scintillation counter. It is to be understood that the necessary power supplies, amplifiers and pulse height discriminator are included with the detector 46. The output of detector 46 is coupled to the cable 15 through vacuum tube 47 and a cathode follower circuit and is sent to the surface of the earth through the cable 15 to be recorded. Tube 47 acts to turn the detecting system on and off in synchronism with the neutron source. The detector output is applied to grid 38 of tube 47 across input resistor 49. The output appears across cathode resistor 50. The synchronizing signal from delay circuit 45 of FIGURE 2 is applied to grid 51 of tube 47 and operates to turn the tube on and off in synchronism with the neutron source.

Figure 4:
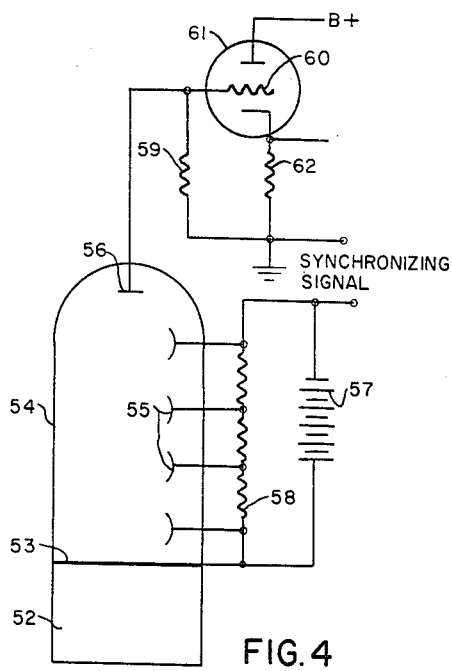
FIGURE 4 is a diagrammatic illustration of a detecting system showing another means for synchronization with the neutron source.

In FIGURE 4 there is illustrated a detecting system employing a scintillation counter with a means for turning it on and off. Radiation impinging on scintillation medium 52 produces flashes of light which irradiate photocathode 53 of photomultiplier tube 54. The photomultiplier tube contains dynodes 55 and anode 56. Battery 57 supplies accelerating voltage to the dynodes across voltage divider 58. In operation photoelectrons emitted from the photocathode 53 are accelerated to the first dynode, producing secondary electrons which are accelerated to the second dynode, where there is further secondary emission of electrons, which are further accelerated to the next dynode, and so on. The secondary electrons leaving the last dynode are collected on the anode, and the resultant electrical pulses are applied across input resistor 59 to grid 60 of tube 61. If necessary, there may be intermediate amplifier stages, but ultimately the signal is taken from a cathode-follower circuit, such as across cathode resistor 62, and applied to the cable 15. The collecting voltage between the last dynode and the anode is obtained from delay circuit 45 of FIGURE 2. In this manner, the photomultiplier is turned on and off in synchronism with the neutron source, and the detecting system shown in FIGURE 4 is thereby synchronized with the neutron source.

It is generally desirable that the length of each half cycle be long enough for equilibrium conditions to be reached; however, any longer period diminishes the efficiency, since only a certain amount of information may be obtained during each cycle and the shorter period permits more cycles and hence more accumulated information. There is no additional information obtained after equilibrium is reached. The length of time the source is on is related to the slowing down time of emitted fast neutrons and the lifetime of thermal neutrons in representative formations. The time on is selected so that the thermal neutron flux approaches equilibrium in a formation of interest. The time off is selected so that the thermal neutron population approaches zero. This is also a function of slowing down time as well as lifetime of neutrons, since there are still some fast neutrons to be slowed at the instant the source is turned off. In this mode of operation, the source is therefore on and off for approximately equal periods of time.

Each half cycle may be from 1 to 5 times the average lifetime of neutrons in the formation, if the slowing down time is small relative to the lifetime of the slow neutrons. If the slowing down time is appreciable, the time on should be 1 to 5 times the sum of average slowing down time and average lifetime in the formation of interest. Since slowing down time and lifetime vary from formation to formation and since it is often desirable to obtain information about all formations penetrated by a well, the time on may be adjusted for an average formation. The time should be as long as the longest average lifetime in any formation of interest; equilibrium will then be nearly reached in all other formations. Water is present in many formations and may be considered characteristic of an average formation. The average lifetime of thermal neutrons in water at ordinary temperatures has been found to be approximately 210 microseconds. The average slowing down time of fast neutrons in water has been found to be approximately 10 microseconds. A satisfactory time on or off is therefore of the order of magnitude of the average lifetime in water or within the limits 20 to 2000 microseconds, 100 to 500 microseconds in most formations likely to be encountered in a normal well.

Figure 5:
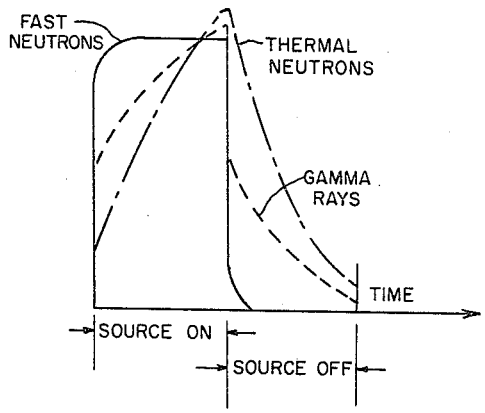
FIGURE 5 illustrates the variation of certain parameters in one cycle of operation.

In FIGURE 5 there are shown approximate wave forms for the population of fast neutrons, thermal neutrons and gamma rays in the vicinity of the instrument as a function of time for a single cycle, beginning with the time when the source is first turned on. The length of each half cycle as shown in FIGURE 5 is approximately twice the average lifetime and the average slowing down time is about 10 percent of the average lifetime. There has been no attempt to plot the curves to the same scale. An ideal source is assumed, one which may be turned on and off with infinite speed. The fast neutron population is therefore a flat-topped curve, deviating only because of the required slowing down time. Since the lifetime of the thermal neutrons is long compared with slowing down time, the thermal neutron population increases until the rate of disappearance of thermal neutrons is equal to the rate of their appearance. The gamma ray population depends upon both fast and thermal neutron populations because the gamma rays arise from both fast and thermal neutron processes. If the source is on until equilibrium is reached, the conditions are those of conventional neutron logging. These conditions depend upon fast neutron range, capture cross-section and albedo for the material of the particular formations. If the fast neutron range is long, the fast neutrons get away from the well and instrument and the populations of fast and thermal neutrons and gamma rays are low. Rapid diffusion of slow neutrons and a short lifetime have a similar effect on thermal neutron and gamma ray population only. Lifetime is inversely related to the capture cross-section. The rate of decay of the curves, following the turning off of the source, depends upon capture cross-section and albedo and not upon fast neutron range, except to the extent that slowing down time is a factor and there remain some fast neutrons.

Figure 6:
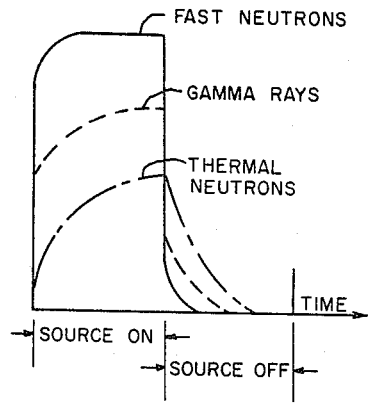
FIGURE 6 illustrates the variation of parameters for a different mode of operation.

In FIGURE 6 there are shown approximate wave forms for the population of fast neutrons, thermal neutrons and gamma rays in the vicinity of the instrument where the length of each half cycle is approximately six times the average lifetime and the average lifetime several times the slowing down time.

Figure 7:
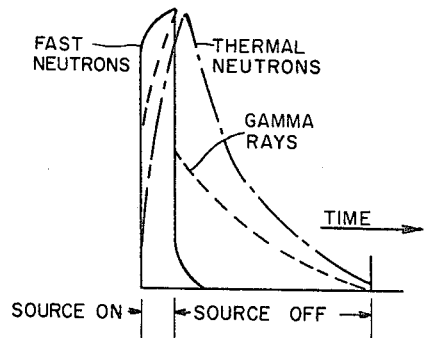
FIGURE 7 illustrates the variation of parameters for still another mode of operation.

For some purposes it is useful to have the source off more than on. This mode of operation is illustrated in FIGURE 7.

As above described, the object of this invention is to determine the effect of the formations upon the lifetime of neutrons emitted by a periodic source. During each cycle a given number of neutrons are emitted, slowed down and captured. If the time the source is on is relatively long, as illustrated in FIGURE 5, many of the neutrons will be captured during the on portion of the cycle, and for a given number of fast neutrons emitted, the number of neutrons or gamma rays detected during the off portion of the cycle depends upon the lifetime of neutrons in the formations; thus, the detectors illustrated in FIGURES 3 and 4 may be turned on during the off portion of the neutron source cycle, and the total processes detected will be indicative of the lifetime of neutrons in the formations. The number of processes detected in any one cycle is very small, but detection occurs during the same portion of each cycle and hence may be accumulated to improve statistical accuracy.

It is not necessary that the detectors detect the slow neurons and gamma rays over the entire off portion of the neutron source cycle. The number of slow neutrons or gamma rays may be detected over a small portion of the cycle, for the cycle, for the number of slow neutrons present at any particular time is related to the decay of slow neutron population and hence to the lifetime of neutrons in the formations.

Figure 8:
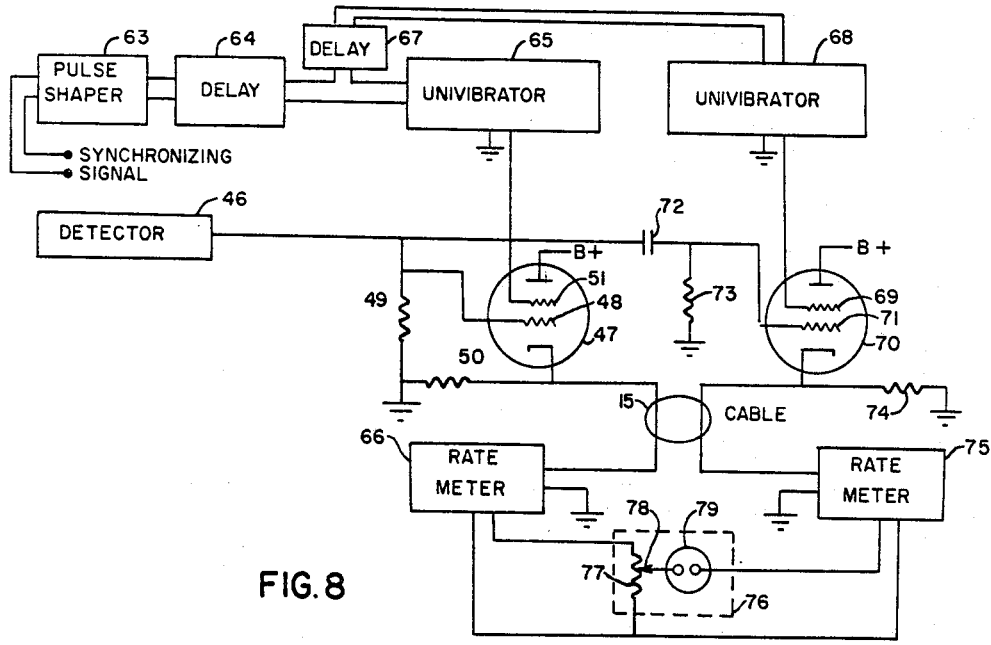
FIGURE 8 is a diagrammatic illustration of means for measuring the lifetime of neutrons.

The number of slow neutrons or gamma rays present at any particular time depends not only upon the lifetime of the slow neutrons, the slowing down time of fast neutrons and the albedo of the formations, but also upon the range of the fast neutrons. In other words, the neutrons emitted from the source penetrate farther in some formations that in others and hence are less likely to produce detection signals. This phenomenon is essentially what is measured in conventional neutron logs. To eliminate the effect of varying neutron range, in one form of this invention detection may be made over two different portions of the period when the source is off and the ratio thereof taken. This determines the rate of the decay of thermal neutron population and is not dependent upon the total population. This may be accomplished by utilizing two detecting systems as illustrated in FIGURE 3, sensitive over different portions of the cycle. Alternatively, the single detector 46 may be used with an additional enabling circuit which makes the detecting system sensitive over two different portions of the cycle. This is illustrated in FIGURE 8. A synchronizing signal from oscillator 38 of FIGURE 2 is applied to a pulse shaper 63 which produces a sharp pulse in synchronism with the periodic neutron source. The shape signal is applied through delay circuit 64 to univibrator 65. The combined effect of delay circuit and univibrator is to produce a pulse for a desired portion of the period when the neutron source is off. This signal is applied to the grid 51 of vacuum tube 47, as described in connection with FIGURE 3, to enable the detecting system to operate over the desired portion of the cycle. During this portion of the cycle, the detection signals are passed to the surface through cable 15. There the pulses may be counted by rate meter 66. The delayed signal from delay circuit 64 is further delayed by delay circuit 67 and applied to univibrator 68. The combined effect of delay circuit 67 and univibrator 68 is to provide a pulse for another desired portion of the period when the neutron source is off. This signal is applied to grid 69 of tube 70.

The signal from detector 46 is also applied to grid 71 of tube 70 through condenser 72 across resistor 73. This tube functions, as described in connection with tube 47, to produce output pulses across cathode resistor 74 during the desired portion of the cycle. These pulses are transmitted up the cable 15 to rate meter 75 where the pulses are counted. The outputs of rate meters 66 and 75 are applied to ratio taking unit 76 which may comprise a self-balancing potentiometer. The larger signal, from rate meter 66, is applied across resistor 77 of the self-balancing potentiometer, and the lessor signal, from rate meter 75, is applied with proper polarity from one end of resistor 77 to the sliding contact 78 through galvanometer 79. The conventional self-balancing potentiometer is constructed so that sliding contact 78 is moved to the position on resistor 77 where there is no current in galvanometer 79. At this position the potentiometer is balanced and the ratio of that part of the resistor across which the output of rate meter 75 is applied to the entire resistor 77 across which the output of rate meter 66 is applied is equal to the ratio of the respective voltages. Sliding contact 78 is connected by a mechanical linkage to a recording pen mechanism which makes a record of the ratio of the outputs of rate meters 75 and 66. If desired, additional information may be recorded by also recording the signals themselves.

Although but two channels are shown in FIGURE 8, any desired number may be used. It is possible to detect during separate consecutive intervals over the entire cycle and record for each separate interval. From this the curves of FIGURES 5, 6 and 7, may be derived. Different parts of each curve depend upon different particular characteristics of the formations and, therefore, a knowledge of the entire curves will provide additional information regarding the formations. In particular, the initial part of the gamma ray curves depends upon fast neutron reactions and, therefore, indicates the interactions of the formations with fast neutrons. The peak of the thermal neutron population is dependent upon the range of neutrons; measurements of this are essentially the same as conventional neutron logs. Since gamma ray population depends upon both fast and slow neutron processes, by measuring gamma rays and slow neutrons separately, the fast neutron interactions may be measured. After the source is off the rate of decay depends initially upon the slowing down time of the fast neutrons as well as the lifetime of the slow neutrons in the formations and the albedo of the formations. Once most of the neutrons have been thermalized, the rate of decay depends solely upon the lifetime of the thermal neutrons and the albedo of the formation. The ratio of two measurements made after most of the neutrons have been thermalized, indicates the lifetime of neutrons in the formations. Thus, by making measurements over several intervals while the source is off, the ratios of these measurements may indicate separately the slowing down time and the combined effect of lifetime of neutrons in the formations and the albedo of the formations.

Figure 9:
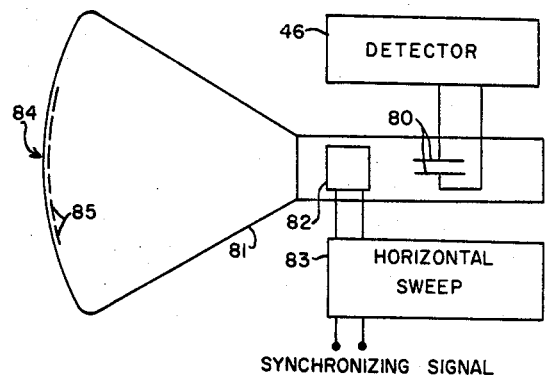
FIGURE 9 is a diagrammatic illustration of cathode ray tube means for measuring the lifetime of neutrons.

In FIGURE 9 there is illustrated another means for analyzing the neutron or gamma ray population during the cycle of a periodically varying neutron source. Detector 46 is again a pulse type detector of either thermal neutrons or gamma rays. In this form of the invention the output of detector 46 is continuously applied to vertical deflecting plates 80 of a cathode ray tube 81 having a conventional electron-gun mechanism. The horizontal sweep voltage is applied to horizontal deflecting plates 82 from source 83 which has the same period as the neutron source and is synchronized with the neutron source by the voltage from delay circuit 45 of FIGURE 2. The horizontal sweep voltage is thereby synchronized to cause the electron beam of cathode tube 81 to sweep linearly across target 84 for each cycle of the neutron source, beginning with the turning on of the source.

Figure 10:
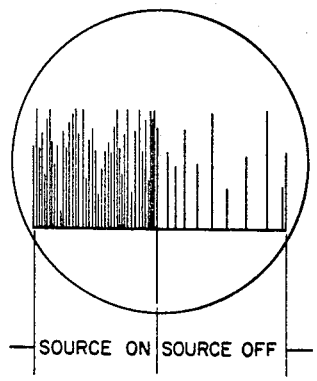
FIGURE 10 illustrates the trace of the electron beam of the cathode ray tube shown in FIGURE 9.

In FIGURE 10 there is illustrated the trace of the electron beam on the target. While the source is on, there are many vertical pulses produced by the application of detection signal pulses to the vertical deflecting plates 80. The height of the pulses on the target is determined by the detection signals in the case of gamma ray detection; however, in the case of neutron detection the pulses may be of uniform height. When the source is off, the number of pulses decreases toward the end of the cycle.

Figure 11:
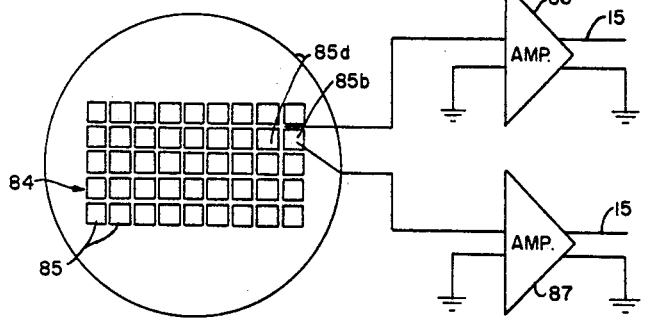
FIGURE 11 illustrates the target plates of the cathode ray tube shown in FIGURE 9.

In FIGURE 11 is shown one form of the target 84 composed of a mosaic of small conducting plates 85. The detecting plates 85 are arranged so that each covers a particular range of time and pulse height. In other words detection signal pulses occurring during a particular time interval and having a particular pulse height cause the electron beam to impinge upon a particular plate 85. When the particular plate is electrically connected to an output circuit, electrical pulses are derived which are indicative of detection pulses occurring during the interval and having the height covered by a particular plate. Thus a particular plate 85a is shown coupled to amplifier 86 which amplifies the pulses before they are applied to the cable 15 for transmission to the surface. Cathode ray tube 81 with its mosaic target 84 therefore functions in the fashion of the apparatus shown in FIGURE 8 to provide separate channels for the detecting system, each operating over a different interval of time. Thus, plate 85b may be connected to amplifier 87 and the amplified signal sent to the surface of the earth through cable 15. The two signals may then be applied to ratio taking unit 76 and the resultant ratio recorded as indicative of the lifetime of neutrons in the formations. Further, the mosaic target provides means for separating the pulses according to pulse height.

As an alternative to a cathode ray tube with a mosaic target, a conventional cathode ray tube with a fluorescent screen may be used with photocell pickups focused upon particular portions of the screen. The photocell outputs may be used in the fashion of the outputs from the plates of the mosaic target.

An alternative to transmitting detection pulses up the cable is to have the counting rate meters in the subsurface apparatus and send the integrated signal to the surface.

Although either gamma ray detection or thermal neutron detection alone are within the scope of this invention, each measurement has advantages and it is preferred to detect both. Measurement of gamma rays during the time the source is off has advantages over detection while the source is on and hence over conventional logging in that gamma rays arising in the source and gamma rays arising from fast neutron processes are not detected. The former factor particularly confuses an attempt to log the effect of neutrons on the formations. In this invention gamma ray detection has advantages over neutron detection because the depth of sampling is in general greater and because the neutron flux in and near the borehole is rapidly reduced by the borehole fluid so that measurements of gamma ray flux made during the latter portion of the off interval are substantially unaffected by the borehole fluid, well casing and instrument housing. Moreover, gamma rays are not attenuated as much by the casing, housing and borehole fluid as are thermal neutrons and may, therefore, be more efficiently detected. Thermal neutron detection has an important advantage over gamma ray detection because it ignores the effects of activation and natural gamma rays. Bombardment of the formations with neutrons causes certain materials to become artificially radioactive and produce delayed gamma rays which tend to obscure measurements of gamma rays produced upon neutron capture.

Whichever type or types of radiation are detected, this invention includes selective detecting or measuring during one or more selected portions of the time the periodic neutron source is off. However, as hereinbefore explained, fast neutrons decay in energy quite rapidly to "slow" energies, and since inelastic scattering reaction predominate when fast neutrons collide with bombarded nuclei, detection and measurement of either fast neutrons or inelastic scattering gamma rays is preferably made during at least a portion of the time when the source is "on." Thus, the present invention includes detecting and measuring either wholly or partly during the time the source is "on," as well as either wholly or partly during the time the source is off.

Another useful form of the present invention involves the measurement of the lifetime of the epithermal neutron population, as distinguished from a measurement of either the slow or thermal neutron population (including the capture gamma population). One method of doing this is to cause the accelerator source to periodically emit a burst of 14 mev. neutrons, and to detect and measure neutrons during only that portion of time wherein the epithermal neutron poulation may be expected to reach a peak and then substantially decline in number. Since chlorine nuclei have a relatively small epithermal neutron capture cross-section, as compared with either the thermal neutron capture cross-section of chlorine nuclei, or with the epithermal neutron capture cross-section had by hydrogen nuclei, this is an extremely useful well logging measurement to perform—especially in correlation with either a conventional porosity measurement, or in conjunction with a measurement of either the lifetime of the thermal neutron or capture gamma ray populations.

Nevertheless, there are certain disadvantages attending the making of a measurement of the lifetime of the epithermal neutron population. For example, the epithermal neutron population peak may be expected to occur within a very short time after cessation of the output of the accelerator, such as within about 10 microseconds or less. Thus, the gating of the detector must be accurately synchronized with the pulsation of the accelerator, in order for such a measurement to be made in a useful manner.

In addition, since the average epithermal neutron decays to thermal energy within a relatively short interval (as compared to the average lifetime of a thermal neutron), the detection interval must necessarily constitute only a relatively short portion of the irradiation-detection cycle. Thus, it is not feasible to detect as many neutrons, during each detection interval, as is desirable. Furthermore, the difficulty is aggravated when the shape of the neutron output pulse is unknown or variable, because calculation of detector dead time is impossible without detailed knowledge of the relative intensity of the total neutron output.

Figure 12:
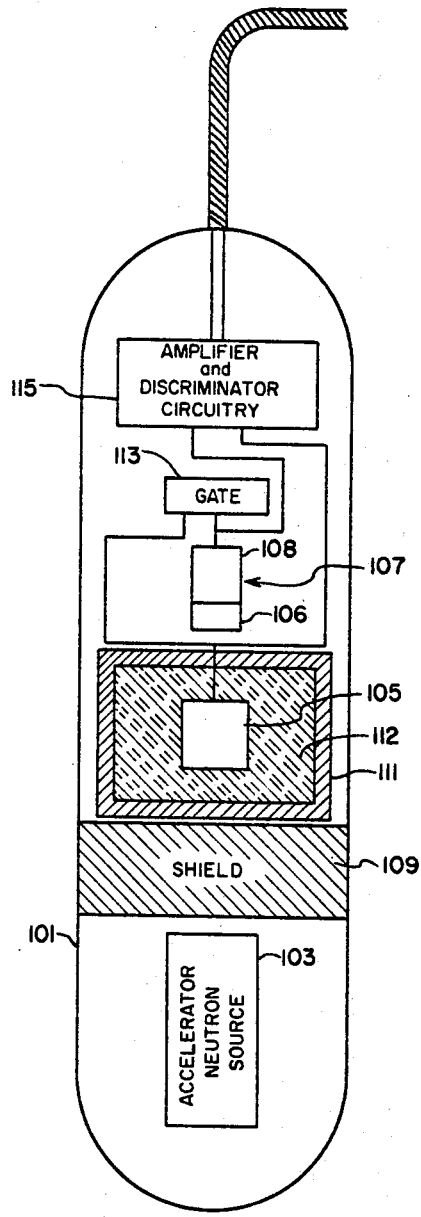
FIGURE 12 is a schematic representation of apparatus directed to a different form of the present invention.

Referring now to FIGURE 12, there may be seen apparatus which is useful in making a more accurate measurement of the lifetime of the epithermal neutron population in a subsurface formation, which apparatus includes a conventional housing 101 containing an accelerator source 103, and both a slow neutron detector 105 and a gamma ray detector 107 arranged in trailing relationship to the source 103. The slow detector 105, which is preferably separated from the source 103 by a suitable shield 109, is also preferably surrounded by a thermal neutron shield 111 which may be composed of cadmium or gadolinium, or of some other suitable material having a high capture cross section for thermal neutrons and a relatively low capture cross section for epithermal neutrons. Both the gamma ray detector 107, and the slow neutron detector 105, are connected to a gate 113 which acts in conjunction with the pulsation of the accelerator source 103, by means of suitable circuitry not depicted, to render them responsive to incident radiation during preselected intervals during, and, or, following each pulse of neutrons.

The gamma ray detector 107 may be a conventional scintillation counter composed of a photomultiplier tube 108 and a sodium iodide crystal as a phosphor 106. The slow neutron detector 105 may be any suitable detection means which is primarily responsive to slow neutrons, such as a helium-3 counter, or a boron trifluoride counter, or a scintillation counter having a lithium iodide crystal.

During the neutron pulse and the following interval wherein fast neutrons are slowed to thermal energy, neutrons of energies greater than thermal energy will penetrate the thermal nuetron shield 111 and strike the slow neutron detector 105. However, only a relatively small number of these incident epithermal or slow neutrons will be detected and most will pass through the slow neutron detector 105 and out into the borehole. If the slow neutron detector 105 is composed of a scintillation counter as hereinbefore explained, and if the phosphor is composed of thin slabs of lithium iodide pasted about a core of paraffin or other hydrogenous material, then the incident neutrons will tend to be "trapped" by the paraffin until captured by the lithium iodide slabs. Thus, the so-called "active" or "on" time of the slow neutron detector may be substantially increased, and the counting rate thereby substantially improved. Such a detector is described in U.S. Patent No. 3,032,658, issued May 1, 1962, to A. H. Youmans.

A preferred form of detection apparatus, for purposes of the present invention, may be seen in FIGURE 12, wherein the slow neutron detector 105 is surrounded by the neutron moderator 112, which may be paraffin as hereinbefore explained. In this manner, the mass of the moderator 112 is substantially increased and thus the "trapping" effect is significantly improved. This alternative form is particularly advantageous when a proportional counter is used as the slow neutron detector 105, since detectors of this type are well known to have a relatively long recovery time such that they are prevented from counting at a high rate of incidence.

The outputs of both the slow neutron detector 105, and the gamma ray detector 107, may be passed to suitable signal processing circuitry 115, and may then be sent to the surface of the earth in a conventional manner. However, the gate 113 need not be adapted to cycle both the slow neutron detector 105 and the gamma ray detector 107 at the same time, nor even for the same length of time. For example, the gamma ray detector 107 may be cycled during the neutron pulse emitted by the source 103 to measure the gamma rays arising from inelastic scattering reactions. On the other hand, activation of the gamma ray detector 107 may be delayed an interval of 100 microseconds after cessation of the neutron pulse, (more or less), whereupon all of the gamma rays produced by neutron capture in the borehole will have been dissipated, and whereupon the only gammas remaining will be presumably those produced by neutron capture out in the formations (and by activation, which may be ignored for these purposes).

Figure 13:
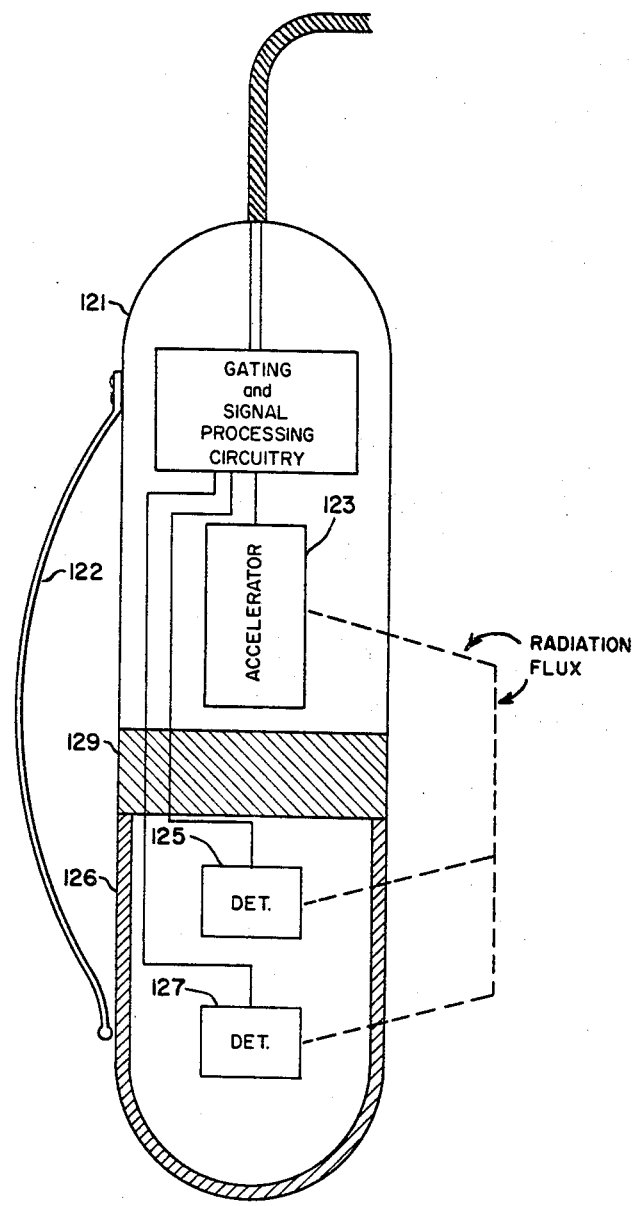
FIGURE 13 is a schematic representation of apparatus directed to another form of the present invention.

Referring now to FIGURE 13, which shows apparatus for performing another form of the instant invention, there may be seen a suitable housing 121 containing an accelerator source 123 of fast neutrons, and containing first and second radiation detectors 125 and 127 arranged in trailing relationship to the source 123. A suitable radiation shield 129 is preferably interposed between the source 123 and the nearest detector 125 to prevent direct irradiation. As used herein, the expression "trailing relationship" is merely intended to describe the spacing of the detectors relative to the source, and does not mean that the detectors necessarily follow the source through the borehole.

As hereinbefore stated, it is particularly desirable to make neutron lifetime measurements in conjunction with a porosity measurement, since the latter measurement can best be used to evaluate formation salinity when the formation porosity is known. Thus, the apparatus represented in FIGURE 13 is directed to the making of simultaneous measurement of the porosity of a formation, as well as the measurement of the lifetime of the neutron population therein.

The source 123 and detectors 125 and 127 are suitably gated in the manner represented in FIGURE 12, and the source 123 is preferably arranged to produce neutron pulses at a frequency between 100 and 1000 p.p.s., with a pulse duration of preferably not more than about 100 microseconds. The two detectors 125 and 127 are preferably arranged at a spacing from the source 123 so that they may provide an optimum indication of variations in radiation intensity due to formation hydrogen content, such as 16 inches and 26 inches, respectively.

Both detectors 125 and 127 should be identical in their spectral response, and may be sensitive to either thermal neutrons or gamma says, or both. Preferably, both detectors 125 and 127 should be scintillation counters employing sodium iodide or cesium iodide crystals as phosphors, and they should have pulse height selection capabilities to reject pulses due ot low energy gamma rays. If detectors 125 and 127 are intended to preferentially measure gamma rays, however, a neutron shield 126 composed of material such are boron-10, or lithium-6, should be interposed about both detectors 125 and 127. On the other hand, if the detectors 125 and 127 are intended to respond to incident neutrons, the neutron shield 126 should be omitted.

As hereinbefore explained, both detectors 125 and 127 are arranged to simultaneously respond in synchronism with the action of the accelerator source 123, and preferably during the interval after each neutron pulse when an appreciable amount of radiation is still observable, but after the thermal neutron population in the borehole has declined to a relatively low intensity. Depending upon the size of the borehole and type of fluid therein, the detection interval may be initiated within 100 to 500 microseconds after cessation of the neutron output of the source 123, and may extend until either the radiation population sought to be detected has substantially declined, or until just before initiation of the next neutron pulse, depending upon the pulsation frequency of the source 123. The output signals from the detectors 125 and 127 are independently transmitted in a conventional manner to the surface of the earth, where they may be separately but correlatively recorded. Further, such signals may be passed to suitable computer equipment to derive and record their ratio to provide a direct indication of the hydrogen content of the formation irradiated by the source 123. Moreover, the ratio of both signals may be correlatively recorded with the output of one of the detectors 125 and 127.

In particular, both detectors 125 and 127 should be opened simultaneously and should be held open during the same interval. The output of both detectors 125 and 127 will differ, one from the other, only to the extent of the difference in spacing of the detectors 125 and 127 from the source 123 (assuming no significant difference between the sections of formation opposite each detector). However, the difference between the output of the detectors 125 and 127, or preferably their ratio, furnishes a very effective indication of the hydrogeneity of this portion of the formation, and therefore of its porosity. Thereafter, but prior to the initiation of the next pulse of neutrons from the source 123, the near detector 125 may be reopened for another suitable detection interval, and the ratio of the outputs of detector 125 during the two detection intervals will indicate the rate of decline of the neutron population in the formation. The measurement of the neutron lifetime provided by the near detector 125 (or alternatively by both detectors 125 and 127) may then be correlatively displayed with the porosity measurement, or a correlation of these measurements may be displayed as a single indication of their relationship.

It should be remembered that the diffusion rate; i.e., the rate of expansion of the thermal neutron cloud away from the source 123, is different from the rate of decline of the thermal neutron population due to capture. Although both phenomena contribute to the net variation of the thermal neutron population at a particular point, they must be distinguished since they are affected by different physical conditions. The capture rate depends entirely upon the capture cross section of the formation nuclei, whereas the diffusion rate depends on the diffusion length which depends, in turn, upon the density and elastic scattering cross section of the nuclei. Thus, simultaneous measurement of the decline of the thermal neutron population, at two different distances in the formation away from the source 123, would be similar (assuming homogeneity of the formation) except for the diffusion length of the formation material. Consequently, if the distant detector 127 is opened concurrently with the near detector 125 during two or more discrete gating intervals, the ratio (or difference) in counts obtained from the far detector 127 during such intervals will indicate the decline of the thermal neutron population in the formation. However, the decline rate indication may differ substantially from that provided by the near detector 125, particularly if the far detector 127 is spaced relatively inordinately far from the source 123. If the formation is assumed to be homogenous between the two detectors 125 and 127, then any such difference between the indicated thermal neutron lifetime at these two detection points may be attributed to the diffusion length of the formations. Thus, gas zones may be indicated in the well by the fact that the diffusion length of such formations is substantially greater than that of fluid-bearing formations of equal porosity.

It will be seen that, when apparatus of this character is employed in such a manner, the measurements obtained will be substantially independent of the effect of both the diameter and the content of the borehole. In a homogenous medium, the thermal neutron population will decline exponentially according to distance from the source 123, and the slope of such exponential decline will be directly related to the hydrogeneity, and independent of the other chemical characteristics, of the medium. Of course, well logging measurements must be made in a borehole, and this obviously destroys the homogeneity of the medium. In other words, such measurements will be directly affected by both the geometry and the content of the borehole.

If, however, detectors 125 and 127 are gated so as to "open" simultaneously with each other, but only after substantially all neutron radiation has disappeared from the borehole, the effect of the contents of the borehole will be effectively eliminated from the measurements. Moreover, since the measurements are restricted in this manner to radiation subsequently entering the borehole and striking one of the detectors, and since such radiation by definition arises as a result of nuclear reactions previously occurring with formation nuclei, the undesirable effect of cement, casing, mud cake, irregular borehole diameter, etc., is substantially eliminated because the radiation reaching both detectors 125 and 127 is absorbed in exactly the same proportion. Furthermore, since both detector signals are influenced to some extent by stand-off of the housing 121 from the borehole wall, and by intervening substances, the ratio of the two signals will be independent of these factors.

Thus, this form of the present invention overcomes the factors which normally render a neutron porosity measurement inaccurate; i.e., the effect of the borehole fluids, and the influence of the position of the tool in the borehole. The former is eliminated by delaying the detection interval until the borehole neutrons have disappeared, and the latter is eliminated by taking a ratio of the two detector signals. Although it is preferred to utilize a pulsed source 123, as hereinbefore described, a continuous source of neutrons may be employed, if the housing 121 is provided with means (such as a conventional bowspring device 122) to decentralize the housing 121 in the borehole, and if means is provided to eliminate the influence of the borehole fluid on the side of the instrument housing 121 away from the borehole wall. This can be easily accomplished by providing boron-10 or lithium-6 shielding on the bowspring 122 side of the housing 121 to effectively block neutrons approaching either detector from this direction. With this arrangement, the source 123 and detectors 125 and 127 may be continuously activated, and the gating circuitry necessary to cyclic operation of the source 123 and the detectors 125 and 127 may be omitted.

In practicing the various forms of the instant invention, it has been found that when a short pulse of 14.4 mev. neutrons is emitted in a borehole, the individual neutrons are slowed to thermal energy within a few microseconds. Thus, a "cloud" of slow neutrons is formed around the source within 10 to 50 microseconds after initiation of the pulse. Furthermore, this neutron cloud is most dense within a few inches of the source, and becomes progressively less dense out to about 3 feet where such radiation is relatively undetectable. It is known that thermal neutrons have an average velocity of about 2200 meters per second at 20 degrees centigrade. Thus, the average thermal neutron travels about 2 millimeters per microsecond while colliding elastically with perhaps 100 hydrogen nuclei, and consequently the average thermal neutron may be expected to be captured before it has travels more than one inch in water.

As has hereinbefore been explained, the number of capture events in a given medium furnishes a direct indication of the number of "live" neutrons in the medium. Furthermore, a measurement of the number of such events at any particular instant furnishes a direct indication of the number of "live" neutrons in the medium at that instant, and two or more such measurements (during one cycle) will furnish a direct indication of the effect had upon the neutron cloud by the irradiated medium. Moreover, selection of a suitable detection interval, with respect to timing and duration, will furnish a direct indication of the effect had on a particular category of the neutrons composing the neutron cloud; i.e., if the detection interval coincides with or closely follows the neutron pulse, then the activity of the fast neutron population can be observed without substantial interference by the activity of the slow neutron population. On the other hand, by delaying the detection interval until the neutrons have substantially all been thermalized or epithermalized, the activity of this class of the neutron population may be observed without interference by radiation representative of the fast neutron population. Consequently, the techniques of the present invention can be effectively varied to provide an indication of either the porosity or the chlorinity, of the formation, by selecting a detection interval to conform to the cross section characteristics of the particular formation nuclei sought to be investigated.

This will be clearly understood in view of the fact that neutron capture and scattering is a matter of statistical probability, and that the greater the number of capturing nuclei irradiated by a neutron pulse, and the greater the capture cross section of such nuclei, the greater the probability that a particular neutron will be captured within a given interval of time. Although the average lifetime of a neutron in a vacuum is about 13 minutes, it is much less in ordinary earth materials. For example, in salt water the average lifetime is about 100 microseconds, and in quartzite it is around 1000 microseconds. Clearly then, it is important to select the detection interval to correspond to the earth characteristic sought to be measured.

As hereinbefore stated, the preferred method of making a neutron lifetime measurement, for quantitative determination of formation characteristics, is to observe the complete decline curve of the neutron induced radiation (thermal neutrons or capture gammas) from the termination of the neutron pulse to the disappearance of all induced radiation (excluding the activation gammas). Thereafter, it is possible to select the portion of the curve having decline characteristics most representative of the formation irradiated, and the other portions of the curve will represent the borehole and the borehole substances. As hereinbefore stated, it is generally assumed that the thermal neutrons in the borehole will be captured early, and therefore it is the latter portion of the time cycle which is representative of the formation. However, this assumption is predicated on the requirement that the borehole be filled with substances, such as salt water, which have a thermal neutron capture cross section greater than either oil or rock substances. If, on the other hand, the borehole is filled with fresh water, oil, or air, the neutron lifetime in the borehole may be much greater than that in the formation material, and it is the earlier portion of the curve which will be representative of the formation. Alternatively, then, it may be desirable to assure that the latter portion of the curve is the portion which is representative of the formation, by the expedient of filling the borehole with salt water (or some other suitable substance) before performing the logging operation.

To restate the foregoing in simpler terms, it will be seen that if the borehole fluids have a higher thermal neutron capture cross section than that of the formation substances, then the early portion of the curve will be representative of the borehole, and the later portion will be representative of the formation. Moreover, since the latest portion of the curve will be representative of the deepest zone of investigation by this well logging method, an intermediate portion of the decline curve may be determined which is representative of the invaded zone of a porous formation. Thus, it is often desirable to select an early, intermediate, and late detection interval, respectively, to indicate these portions of lateral penetration by the fast neutrons. In this case, the ratio of radiation counts obtained during the first two intervals will indicate the lifetime of thermal neutrons in and near the borehole, and the ratio radiation counts obtained during the second two intervals will best indicate the lifetime of the thermal neutrons in the formations.

In the case of a deeply invaded formation, it may be that the thermal neutron cloud will fail to penetrate in sufficient numbers past the invaded zone to give a clear picture of the uninvaded zone of the formation. However, the ratio of the early and intermediate interval measurements will furnish a correction factor which can be used to determine the effect had, on the thermal neutron population, by the formation substances.

Obviously, both the shallow investigation measurement and the deep investigation measurement may be correctly interpreted if the actual depth of the invaded zone is known. In fact, if either a deep or no invasion zone may be assumed, then either the deep or the shallow measurement can be empirically derived from the other. However, the two measurements can be used to determine the depth of invasion as well as the formation effect on the lifetime of thermal neutrons, since the deep and shallow measurements are affected by both of these unknown factors although to a different extent. In other words, assuming that the properties of the invading fluid are known, each of these two measurements is a function of the invasion depth and the true formation lifetime, and thus the two measurements uniquely define both of these parameters. Determining these factors from the deep and shallow measurements is simply a matter of solving for two unknowns in the usual manner.

An alternative method of obtaining deep and shallow measurements is to utilize detectors having differing sampling depths by virtue of having different radiation sensitivities. In other words, a gamma ray detector may be employed to make the deep measurement, and a neutron detector can be employed for the shallow measurement. The two detectors may be gated together, as hereinbefore described, or they may be gated to respond separately during intervals which prove to be optimum for each measurement.

In another form of the present invention particularly suitable for determining the porosity of uncased boreholes, apparatus comprising a pulsed accelerator and a capture gamma ray (or thermal neutron) detector may be logged through the well to make a neutron lifetime measurement of the formations as hereinbefore set out. Thereafter, the borehole fluid may be exchanged with new fluid having a known thermal neutron capture cross section, and this known fluid may be injected into the well in a manner to replace the first fluid in the invaded portion of the formations sought to be investigated. A second lifetime measurement is then made and correlated with the first lifetime measurement to determine the porosity of the formation. Alternatively, the first measurement may be eliminated from the method, if the capturing effect of the known fluid on the thermal neutron population has been empirically determined.

In addition to the measurement of characteristics such as salinity and porosity, the present invention may be employed for other purposes. For example, if the detector is "opened" while the accelerator is pulsed, carbon can be observed by means of a spectral measurement of those gamma rays occurring as a result of fast neutron processes in the formation. In such an event, however, chlorinity and porosity may not be observed concurrently, because these characteristics are related to slow neutron processes which do not occur until the fast neutrons (and gamma radiation related thereto) have substantially disappeared.

On the other hand, a substantially improved activation measurement may be effectively perform with the instant invention in that activation detector may be positioned much more closely to the source than the 6 foot spacing normally employed, and thus the counting rate is substantially improved. In such case, however, the pulse rate of the source is preferably reduced to a point where all neutrons from each pulse disappear completely between pulses, and so that sufficient additional time is provided for adequate measurement of the activation radiation produced by the unstable isotopes.

Numerous other variations and modifications may obviously be made without departing from the scope and concept of the present invention. Accordingly, it should be clearly understood that those forms of the present invention which are described herein, and which are depicted in the figures of the accompanying drawings, are illustrative only and are not intended to limit the scope of this invention.

What is claimed is:
1. The method of well logging comprising the steps of:
irradiating the formations surrounding a well with a discrete burst of high energy neutrons in a manner to develop therein a population of neutrons of substantially a preselected energy which diffuse among and are captured by formation nuclei during a first time period functionally related in occurrence and duration to the character of said formation nuclei and to said preselected energy,
detecting radiations emanating from said irradiated formations during a predetermined second preselected time period which includes at least a portion of said first time period,
establishing an electrical signal functionally related to said detected radiations and indicative of the rate of decline of said population of neutrons of a preselected energy, and
recording said signal together with a correlative indication of depth.
2. The method of well logging comprising the steps of:
irradiating the formations surrounding a well with a discrete burst of fast neutrons in a manner to develop a cloud of thermal neutrons in said formations, said thermal neutron cloud attaining a population peak and then declining in number at a rate functionally related to the capturing characteristics of nuclei of said formations, detecting radiations emanating from said irradiated formations during a preselected time interval generally encompassing said peak and at least a portion of such decline of said thermal neutron cloud, establishing a signal composed of electrical pulses functionally related to the number and occasion of said detected radiations, and recording said signal in a manner to indicate the rate of decline of said thermal neutron cloud in said formations.

3. The method described in claim 2, wherein said detected radiations are substantially composed of thermal neutrons.

4. The method described in claim 2, wherein said detected radiations are substantially composed of gamma rays resulting from capture of said population of thermal neutrons by said nuclei of said formations.

5. The method of well logging comprising the steps of:
irradiating the formations surrounding a well with a discrete burst of fast neutrons in a manner such that said fast neutrons develop a cloud of thermal neutrons in said formations, said thermal neutron cloud attaining a population peak and then declining in number at a rate functionally related to the capturing characteristics of nuclei of said formations, detecting radiations emanating from said irradiated formations following said burst of fast neutrons and during a preselected time interval such that said detected radiations are substantially representative of the decline of those thermal neutrons captured in said formations and not of thermal neutrons captured in said well, establishing a signal composed of electrical pulses functionally related to the number and occasion of said detected radiations, and recording said signal in a manner to indicate the rate of decline of said thermal neutrons captured in said formations.

6. The method of well logging comprising the steps of:
irradiating the formations surrounding a well with a discrete burst of fast neutrons in a manner such that said fast neutrons develop a cloud of thermal neutrons in said formations, said thermal neutron cloud attaining a population peak and then declining in number at a rate functionally related to the capturing characteristics of nuclei of said formations, detecting gamma radiations emanating from said irradiated formations following said burst of fast neutrons and during a preselected time interval commencing subsequent to the capture of substantially all thermal neutrons captured in said well and including at least a portion of the time during which a substantial number of said cloud of thermal neutrons are captured by said nuclei of said formations, establishing a signal composed of electrical pulses functionally related to the number and occasion of said detected gamma radiations, and recording said signal in a manner to indicate the rate of decline of said thermal neutrons captured in said formations.

7. The method of well logging comprising the steps of:
irradiating the formations surrounding a well with a discrete burst of fast neutrons in a manner such that said fast neutrons develop a cloud of thermal neutrons in said formations, said thermal neutron cloud attaining a population peak and then declining in number at a rate that is functionally related to the capturing characteristics of nuclei of said formations, detecting neutrons emanating from said irradiated formations during a preselected time interval commencing after substantially all of said fast neutrons thermalized in said well have been captured and including at least a portion of the time during which a substantial number of said fast neutrons are thermalized in said formations, establishing a signal composed of electrical pulses functionally related to the number and occasion of said detected neutrons, and recording said signal in a manner to indicate the rate of decline of said thermal neutrons in said formations.

8. A method of well logging comprising the steps of:
irradiating the formations surrounding a well with a discrete burst of fast neutrons in a manner to develop a cloud of thermal neutrons in said formations, said thermal neutron cloud attaining a population peak and then declining in number at a rate that is functionally related to the capturing characteristics of nuclei of said formations, detecting at a first point in said well during at least two discrete time intervals radiations emanating from said formations after capture of substantially all neutrons in said well and during capture of neutrons in said formations, detecting at a second point spaced axially in said well from said first point and during at least one of said two time intervals radiations emanating from said formations, establishing first and second signals respectively functionally related to said radiations detected at said first and second points, deriving and correlatively recording a functional relationship between said first and second signals together with an indication of depth.

9. The method of well logging described in claim 8, wherein said first signal is indicative of the decline of said thermal neutron population in said formations during said two time intervals, and wherein said second signal is indicative of the porosty of said formations.

10. The method of well logging described in claim 8, wherein said first and second signals each indicate the decline of said thermal neutron population in said formations during said two time intervals, and wherein said relationship derived and recorded is the ratio of the first and second signals.

11. The method of well logging described in claim 10, wherein said radiations detected at said first and second points are thermal neutrons.

12. The method of well logging described in claim 10, wherein said radiations detected at said first and second points are gamma rays resulting from neutron capture.

13. The method of well logging described in claim 8, wherein said radiations detected at said first point are thermal neutrons, and wherein said radiations detected at said second point are functionally representative of epithermal neutrons in said formations.

14. The method of well logging described in claim 8, wherein said radiations detected at said first point are capture gamma rays, and wherein said radiations detected at said second point are functionally representative of epithermal neutrons in said formations.

15. Apparatus for well logging comprising
a source of neutrons,
first and second radiation detectors arranged in a trailing relationship to said source,
means for causing said source to produce a discrete burst of neutrons and for gating said detectors to provide an indication functionally representative of the rate of decline of at least a portion of said neutrons in a medium, and
recording means interconnected with said first and second detectors.

16. Apparatus for well loging comprising
a source of neutrons including pulsing means for causing said source to emit said neutrons in a discrete burst for irradiating a medium, first and second detectors arranged in a trailing relationship to said source to sense radiations emanating from said medium, said detectors including gating means interconnected with said pulsing means for activating said first detector during at least two discrete time intervals following said burst and activating said second detector during and coincident with at least one of said time intervals, and means interconnected with said detectors to derive and record a first functional relationship between the number of radiations sensed by said first detector during two time intervals and to derive and record a second functional relationship between the number of radiations sensed by said first and second detectors during and coincident with said one of said two time intervals.

17. A method of surveying subsurface earth formations surrounding a borehole containing a substance having a predetermined ability to capture thermal neutrons, said method comprising irradiating said substance and said formations with a discrete burst of fast neutrons which develop a cloud of thermal neutrons in said substance and said formations, said thermal neutron cloud attaining a population peak and then declining in number in said formations at a rate that is functionally related to the capturing ability of nuclei in said formations and in number in said borehole at a rate that is functionally related to the capturing ability of nuclei in said substance, detecting substantially only radiations emanating from said formations following said burst of fast neutrons during at least a portion of such decline of said thermal neutron cloud in said formations such that said thermal neutrons in said borehole have been substantially all captured by said nuclei in said substance in said borehole, establishing a signal composed of electrical pulses functionally related in number and occasion to said detected radiations, and utilizing said signal to determine the rate of decline of said thermal neutron population in said formations.

18. A method of investigating subsurface earth formations surrounding a borehole containing a substance having a greater thermal neutron capturing ability than said formations, said method comprising irradiating said substance and said formations with a discrete burst of fast neutrons which slow down and develop in said substance and formations a cloud of thermal neutrons which declines away according to the capturing ability of said substance and formations, detecting radiations emanating from said irradiated formations during two preselected equal time intervals following an earlier time interval during which said thermal neutrons in said borehole are substantially all captured by said substance, counting the detected radiations detected during said two preselected equal time intervals, and determining the rate of decline of said thermal neutron cloud in said formations.

19. A method of well logging comprising the steps of:

irradiating the formations surrounding the borehole with a pulse of fast neutrons, detecting thermal neutrons and gamma rays arising from neutron capture reactions during a plurality of discrete time intervals following said pulse, deriving a function of the ratio of said gamma rays detected during one of said intervals to the gamma rays detected during another of said intervals, deriving a function of the ratio of said thermal neutrons detected during said one of said intervals to the thermal neutrons detected during another of said intervals, and recording said functions of said ratios together with a correlative indication of borehole depth.

20. A method of well logging comprising the steps of:

irradiating the formations surrounding the borehole with a pulse of fast neutrons, detecting at one point in said borehole and during a preselected discrete interval radiations emanating from said irradiated formations, detecting at another different point in said borehole and during said preselected discrete interval radiations emanating from said irradiated formations, deriving an indication of the number of radiations detected at said one point in said borehole, deriving an indication of the number of radiations detected at said another point in said borehole, and deriving a function of the ratio of said radiations detected at said one point to said radiations detected at said another point.

21. The method described in claim 20, including the steps of:

recording one of said indications of the number of detected radiations and the function of said ratio together with a correlative indication of borehole depth.

22. A method of well logging comprising the steps of:

irradiating the formations surrounding the borehole with a pulse of fast neutrons, detecting at one point in said borehole and during two discrete time intervals following said pulse radiations functionally related to the macroscopic thermal neutron capture cross section of said formations, detecting at another different point in said borehole and during one of said intervals radiations functionally related to the macroscopic thermal neutron capture cross section of said formations, deriving a function of the ratio of said radiations detected at said one point during one of said intervals to said radiations detected at said one point during the other of said intervals, and recording an indication of said radiations detected at said another point and said derived function together with a correlative indication of borehole depth.

23. The method described in claim 22, wherein said radiations detected at said one point are gamma rays produced by neutron capture reactions in said formations after substantially all neutrons in said borehole have been captured.

24. A method of well logging comprising the steps of:

irradiating the formations surrounding the borehole with a pulse of fast neutrons, detecting at one point in said borehole and during two discrete time intervals following commencement of said pulse epithermal neutrons emanating from said formations, detecting at another different point in said borehole epithermal neutrons emanating from said formations during one of said two time intervals, deriving a function of the ratio of said epithermal neutrons detected at said one point during one of said intervals to the epithermal neutrons detected at said one point during the other of said intervals, and recording an indication of said epithermal neutrons detected at said another point and said derived function together with a correlative indication of borehole depth.

25. A method of well logging comprising the steps of:

irradiating the formations surrounding the borehole with a discrete burst of fast neutrons, detecting thermal neutrons at a first point in said borehole during two discrete time intervals following the commencement of said burst of fast neutrons, detecting epithermal neutrons at a second point in said borehole, establishing a first electrical signal functionally related to the rate of decline of said detected thermal neutrons, and establishing a second electrical signal functionally related to said detected epithermal neutrons.

26. A method of well logging comprising the steps of:

irradiating the formations surrounding the borehole with a discrete burst of fast neutrons, detecting at a first point in said borehole gamma rays arising from neutron capture during two discrete time intervals following commencement of said burst of fast neutrons, detecting epithermal neutrons at a second point in said borehole, establishing a first electrical signal functionally related to the rate of decline of said detected gamma rays, and establishing a second electrical signal functionally related to said detected epithermal neutrons.

27. A method of well logging in a borehole traversing a partially invaded formation, said method comprising:

generating a pulse of fast neutrons in said borehole to establish a cloud of thermal neutrons extending through the invaded zone and into the non-invaded zone of said formation, detecting radiations from said formations during at least three discrete time intervals following commencement of said pulse of fast neutrons, deriving from radiations detected during two of said intervals an indication of the rate of decline of said thermal neutrons in said invaded zone, and deriving from radiations detected during another different two of said intervals a correlative indication of the rate of decline of said thermal neutrons in said non-invaded zone.

28. The method of well logging described in claim 27, wherein said detected radiations are thermal neutrons.

29. The method of well logging described in claim 27, wherein said detected radiations are gamma rays produced by thermal neutron capture in said formation.

30. A method of well logging in a borehole comprising the steps of:

irradiating the formations surrounding said borehole with a pulse of fast neutrons to establish a population of thermal neutrons in said formations, detecting gamma rays arising from thermal neutron capture reactions in said formations during a first discrete time interval, detecting gamma rays arising from thermal neutron capture reactions in said formations during a second later discrete time interval, detecting gamma rays from unstable isotopes during a third discrete time following said second interval and after said thermal neutron population has substantially declined, deriving a function of the ratio of said gamma rays detected during one of said first and second intervals to the gamma rays detected during the other of said first and second intervals, and deriving a measurement of at least a portion of the gamma rays detected during said third interval.

31. A method of determining the characteristics of a fluid-permeated formation surrounding a borehole, said method comprising irradiating said permeated formation with a first pulse of fast neutrons to establish a first thermal neutron population in the region of said formation adjacent said borehole, deriving a function of the rate of decline of said first thermal neutron population in said region.

thereafter exchanging the fluid in said region of said permeated formation with a preselected fluid having a predetermined thermal neutron capture cross section, irradiating said permeated formation with a second pulse of fast neutrons to establish a second thermal neutron population in the reigon of said formation adjacent said borehole, deriving a function of the rate of decline of said second thermal neutron population in said region, and comparing said funcion of the rate of decline of said first population with said function of the rate of decline of said second population.

32. A method of determining the characteristics of a fluid-permeated formation surrounding a borehole, said method comprising permeating at least a portion of the region of said formation adjacent said borehole with a preselected fluid having a predetermined capturing effect on thermal neutrons, irradiating said permeated region with a burst of fast neutrons to establish a thermal neutron population in said region of said formation, and deriving a function of the rate of decline of said thermal population.

33. A method of well logging in a bore hole traversing an earth formation having a macroscopic thermal neutron capture cross section not greater than that of the contents of said borehole, said method including the steps of:

irradiating said borehole with a pulse of fast neutrons, detecting thermal neutrons in said borehole during a first time interval wherein at least a portion of said fast neutrons are thermalized and captured in said contents of said borehole, detecting thermal neutrons in said bore hole during a second later time interval, and deriving a function of the ratio of said thermal neutrons detected during one of said intervals to said thermal neutrons detected during the other of said intervals.

34. A method of well logging in a borehole traversing an earth formation having a macroscopic thermal neutron capture cross section not greater than that of the contents of said borehole, said method including the steps of:

irradiating said borehole with a pulse of fast neutrons, detecting gamma rays during a first time interval wherein at least a portion of said fast neutrons are thermalized and captured in said contents of said borehole, detecting during a second later time interval gamma rays arising from capture of thermal neutrons, and deriving a function of the ratio of said gamma rays detected during one of said intervals to the gamma rays detected during the other of said intervals.

35. A method of well logging comprising the steps of:

irradiating the earth formations surrounding said borehole with a pulse of fast neutrons, detecting radiations occasioned in said borehole and formations by said pulse during a first time interval, detecting radiations occasioned in said formations by said pulse during a second time interval following the absorption of substantially all neutrons in said borehole, detecting radiations occasioned in said formations by said pulse during a third time interval following said second time interval, deriving a function of the radio of the radiations detected during one of said second and third intervals to the radiations detected during the other of said second and third intervals, and recording said function and an indication of said radiations detected during said first interval together with a correlative indication of depth in said borehole.

36. The method of well logging described in claim 35, wherein said radiations detected during said first interval are thermal neutrons.

37. The method of well logging described in claim 35, wherein said radiations detected during said first interval are gamma rays.

38. The method of well logging described in claim 36, wherein said earth formations are irradiated at least partially during said first time interval.

39. The method of well logging described in claim 37, wherein said earth formations are irradiated at least partially during said first time interval.

40. A method of well logging comprising the steps of
irradiating the earth formations surrounding said borehole with a pulse of fast neutrons,
detecting thermal neutrons and gamma rays emanating from said formations during a plurality of discrete time intervals at substantailly a common point in said borehole,
deriving a function of the ratio of the gamma rays detected during one of said intervals to the gamma rays detected during the other of said intervals,
deriving a function of the ratio of the thermal neutrons detected during one of said intervals to the thermal neutrons detected during the other of said intervals, and
recording an indication of said functions together with a correlative indication of the depth of said common point in said borehole.

41. Apparatus for well logging comprising
a source of neutrons,
radiation detection means spaced from said source of neutrons and including a helium-3 counter,
means for operating said source and detection means to produce a discrete burst of neutrons and to measure the rate of decline of radiations occasioned in a medium by said burst of neutrons, and
recording means interconnected with said detection means.

42. Apparatus for well logging comprising
a source of neutrons;
radiation detection means spaced from said source of neutrons and including
a phosphor,
a photomultiplier optically connected to said phosphor, and
a boron shield disposed about said phosphor;
means for operating said source and detection means to produce a discrete burst of neutrons and to measure the rate of decline of radiations occasioned in a medium by said burst of neutrons; and
recording means interconnected with said detection means.

43. Apparatus as decribed in claim 42, wherein said phosphor is composed of cesium iodide.

44. Apparatus as described in claim 42, wherein said phosphor is composed of sodium iodide.

References Cited
UNITED STATES PATENTS 3,102,956   9/1963   Armistead.
3,115,579   12/1963   Hall et al.

ARCHIE R. BORCHELT, *Primary Examiner.*